United States Patent
Witthaus et al.

(10) Patent No.: US 8,182,686 B2
(45) Date of Patent: May 22, 2012

(54) HOLLOW FIBER MEMBRANE SEPARATION DEVICE

(75) Inventors: Friedrich Witthaus, Namborn (DE); Gerhard Breith, St. Wendel (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 740 days.

(21) Appl. No.: 11/991,913

(22) PCT Filed: Jun. 8, 2006

(86) PCT No.: PCT/EP2006/005507
§ 371 (c)(1),
(2), (4) Date: Mar. 11, 2009

(87) PCT Pub. No.: WO2007/031121
PCT Pub. Date: Mar. 22, 2007

(65) Prior Publication Data
US 2009/0301961 A1  Dec. 10, 2009

(30) Foreign Application Priority Data
Sep. 12, 2005  (DE) .......................... 10 2005 043 321

(51) Int. Cl.
*B01D 63/00* (2006.01)
*C02F 1/44* (2006.01)
(52) U.S. Cl. ............. 210/321.8; 210/321.9; 210/321.88; 210/321.89; 96/8; 96/10
(58) Field of Classification Search .. 210/321.78–321.8, 210/321.87–321.9, 500.23; 96/8–10
See application file for complete search history.

(56) References Cited

U.S. PATENT DOCUMENTS

| 4,686,039 | A | | 8/1987 | Otstot et al. |
| 5,053,130 | A | * | 10/1991 | Raff et al. ................. 210/321.79 |
| 5,236,586 | A | * | 8/1993 | Antoni et al. ............... 210/321.8 |
| 5,472,601 | A | * | 12/1995 | Eguchi ....................... 210/321.8 |
| 6,014,765 | A | * | 1/2000 | Maeda et al. .................. 714/748 |
| 6,074,559 | A | | 6/2000 | Hahmann et al. |
| 6,830,685 | B2 | * | 12/2004 | Pope et al. ............... 210/321.89 |
| 7,014,765 | B2 | * | 3/2006 | Dannenmaier ............ 210/321.8 |

FOREIGN PATENT DOCUMENTS

| EP | 0 706 818 A1 | 4/1996 |
| EP | 0 844 015 A | 5/1998 |
| EP | 1 323 462 A2 | 7/2003 |
| GB | 1 537 414 A | 12/1978 |
| JP | 7307700 | 8/1995 |
| JP | 2004 154772 | 6/2004 |

* cited by examiner

*Primary Examiner* — Ana Fortuna
(74) *Attorney, Agent, or Firm* — Jacobson Holman PLLC

(57) ABSTRACT

A hollow fiber membrane separation device with two flow spaces, of which a first space is formed by the capillary tube passages of a hollow-fiber bundle cast at its ends into a sealing compound, and a second space is formed by a housing enclosing the fiber bundle. The first space is sealed off by caps, placed on the sealing compounds, with seals running over the peripheral areas of the sealing compounds. The housing, into which the hollow-fiber bundle is drawn, at each end of its casing has tooth-like or pinnacle-like projections formed by axial notches or indentations running out freely. The tooth-like or pinnacle-like projections have extensions extending from the sides of the projections and extending to the adjacent tooth-like or pinnacle-like projection.

18 Claims, 1 Drawing Sheet

HOLLOW FIBER MEMBRANE SEPARATION DEVICE

This is a national stage of PCT/EP06/005507 filed Jun. 8, 2006 and published in German, which claims priority of German application 10 2005 043321.9, filed on Sep. 12, 2005.

BACKGROUND OF THE INVENTION

1. Field of the Invention

The present invention refers to a hollow fiber membrane separation device with two flow spaces, of which a first space is formed by the capillary tube passages of a hollow-fiber bundle cast at its ends into a sealing compound, and a second space is formed by a housing enclosing the fiber bundle, in which the first space is sealed off by caps placed on the sealing compounds, and in which the housing, into which the hollow-fiber bundle is drawn, at each end of its casing has tooth-like or pinnacle-like projections formed by axial notches or indentations running out freely.

2. Description of the Related Art

Hollow fiber membrane separation devices of said kind are for instance known from EP-A-0 844 015. In said hollow fiber membrane separation devices, two flow spaces are formed, of which a first space is formed by the capillary tube passages of a hollow-fiber bundle cast at its ends into a sealing compound, and a second space is formed by a housing enclosing the fiber bundle. The first space is sealed off by caps, placed on the sealing compounds, with seals running over the peripheral areas of the sealing compounds. The respective hollow-fiber bundle is drawn into the housing. At each end of its casing, the housing has tooth-like or pinnacle-like projections formed by axial notches or indentations running out freely. The outer areas of the projections are embedded in the sealing compounds so that the free inner areas of the notches or indentations form flow passages for the fluid.

Since the housing, which is pipe-section-shaped and is preferably provided with a circular cross-section, consists of a material having elastic properties, such as polycarbonate, wreath-shaped edges consisting of flexible tongues are formed by the notches or indentations, said edges being at least partially enclosed by the sealing compound. When the sealing compound hardens to form disks, said disks can shrink essentially free of stress, wherein the flexible tongues offer no significant resistance to this shrinking. Thereby, the disks formed by the sealing compounds are firmly joined to the ends of the tubular housing so that the two flow spaces can then be reliably separated from one another by the two caps overlapping one another, with the appropriate sealing means.

Such housings which are formed with the tooth-like or pinnacle-like projections have, however, the drawback that, during the manufacture of the hollow fiber membrane separation device, individual hollow fibers or hollow-fiber bundles can press through the gaps of the axially directed pinnacles. Consequently, the outer hollow fibers or hollow-fiber bundles can protrude out in the gap between the tooth-like or pinnacle-like projections. This is inconvenient during the manufacturing process.

SUMMARY OF THE INVENTION

Therefore, it is the object of the present invention to further develop a hollow fiber membrane separation device of the generic type such that it can be manufactured in a simpler way and free of troubles.

The solution of the object is a new design of the housing of the hollow fiber membrane separation device. The new design is based upon a hollow fiber membrane separation device with two flow spaces, of which a first space is formed by the capillary tube passages of a hollow-fiber bundle cast at its ends into a sealing compound, and a second space is formed by a housing enclosing the fiber bundle, in which the first space is sealed off by caps placed on the sealing compounds, and in which the housing, into which the hollow-fiber bundle is drawn, at each end of its casing has tooth-like or pinnacle-like projections formed by axial notches or indentations running out freely. According to the present invention, the housing of the hollow fiber membrane separation device has extensions between the tooth-like or pinnacle-like projections. These, extensions extend from the projections and toward the adjacent tooth-like or pinnacle-like projection.

The extensions between the tooth-like or pinnacle-like projections form cross-struts, so to speak, which prevent a passing through of the outer hollow fibers of the hollow-fiber bundle through the gaps between two adjacent tooth-like or pinnacle-like projections. Said extensions extend from a tooth-like or pinnacle-like projection. In a first aspect of the invention, two adjacent pinnacles are connected by means of the extensions, wherein the extensions have such a geometrical design (e.g. wavelike or zigzagged) that they are no hindrance to a change of distance between two pinnacles or to their moveability. In a second aspect of the invention, the extensions are not connected to an adjacent projection. Both aspects of the invention guarantee the desired elasticity which serves to form a stress-free connection with the shrinking sealing compound.

Advantageous further developments of the present invention include the extensions extending from the projections being preferably formed as arch-shaped or sickle-shaped hooks. The sickle-shaped hooks bring about an even better connection with the sealing compound surrounding the projections. The risk of breaking of the material is additionally clearly reduced.

According to a particularly advantageous further development of the invention, over the height of a tooth-like or pinnacle-like projection and extending therefrom two extensions are branched towards each side.

As a further advantageous embodiment, the extensions extending from the tooth-like or pinnacle-like projections are not connected to the adjacent tooth-like or pinnacle-like projections. Alternatively, the extensions extending from the tooth-like or pinnacle-like projections are connected to the adjacent tooth-like or pinnacle-like projections.

Further, the present invention is directed to a housing for a hollow fiber membrane separation device as described herein, the housing having tooth-like or pinnacle-like projections provided at its ends, the projections having extensions respectively extending from the projections and each extending to the adjacent tooth-like or pinnacle-like projection.

The housing can be formed in one piece by injection moulding of a flexible plastic material.

BRIEF DESCRIPTION OF THE DRAWINGS

Further features, details and advantages of the invention result from the embodiment represented in the drawing, wherein.

DETAILED DESCRIPTION OF THE PREFERRED EMBODIMENTS

Figure 1:
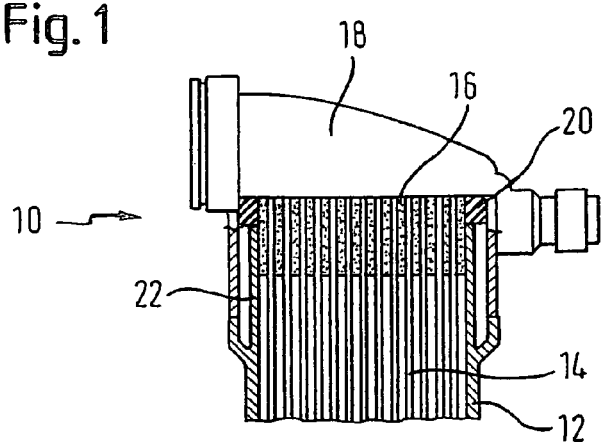
FIG. 1 shows a longitudinal section through one side of the inventive hollow fiber membrane separation device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The hollow fiber membrane separation device 10 consists of a pipe-section-shaped housing 12 made of plastic material, for instance polycarbonate. A hollow-fiber bundle is inserted into the housing. The ends of said hollow fiber membrane bundle 14 are embedded in a sealing compound 16, for instance consisting of PU, which has a disk shape after its hardening. By means of the sealing compound 16, the hollow fibers 14 are joined to the housing 12.

A cap 18 is placed on the housing, said cap being sealed off by means of a seal 20.

The exact structure and the function of such hollow fiber membrane separation devices is described in detail in EP-A-0 844 015 which was previously identified above, the complete disclosure of which is hereby incorporated herein by reference.

Figure 2:
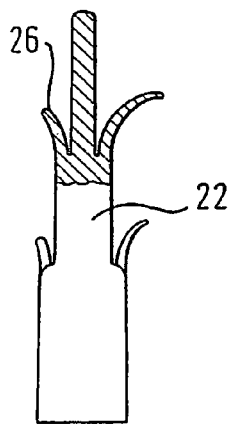
FIG. 2 shows a detail of an end part of the housing of the hollow fiber membrane separation device.
Figure 4:
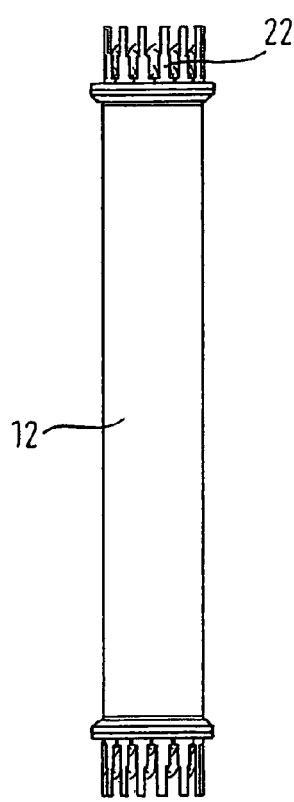
FIGS. 4 and 5: show representations of the housing of the hollow fiber membrane separation device prior to the insertion of the fiber bundle and prior to the mounting of the caps.
Figure 3:
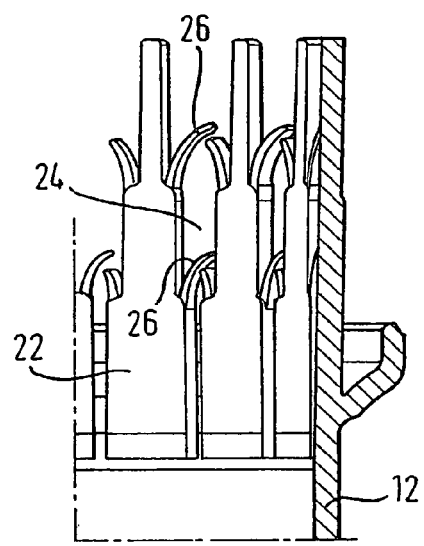
FIG. 3 shows a detail of the hollow fiber membrane separation device housing.
Figure 5:
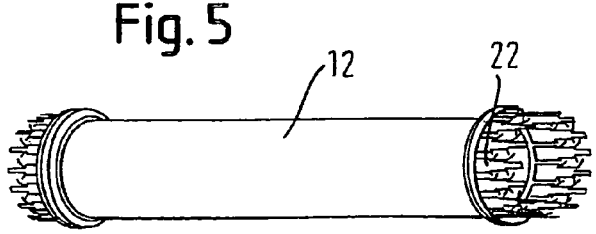

At each end of its casing, the pipe-section-shaped housing 12 has axial notches or indentations running out freely which are formed between tooth-like or pinnacle-like projections 22 (see FIGS. 1 through 5).

The gap 24 existing between the pinnacles 22 is bridged according to the present invention by extensions 26 extending from the projections 22. As can be seen in particular in FIGS. 2 and 3, said extensions are formed as arch-shaped or sickle-shaped hooks which do not touch the adjacent tooth-like or pinnacle-like projections 22. In the embodiment represented here, two extensions 26 being arranged one above the other are arranged on each side of the projection 22. Due to said arrangement, an intensive connection with the sealing compound (see FIG. 1) is obtained. Due to the maintained flexibility between the adjacent tooth-like or pinnacle-like projections, which are precisely not connected with each other by means of the extensions 26, a stress-free connection with the strongly shrinking sealing material made of polyurethane can be formed.

During the manufacturing process, the hollow fiber bundles 16 are introduced into the housing 12. A protruding of the individual hollow fibers from the gap between the projections 22 can be reliably avoided by the extensions 26 provided according to the invention.

Moreover, the sickle-shaped design of the extensions 26 renders possible a simple and cost-advantageous design of the injection mould, as said geometrical form can be forcibly removed from the mould in axial direction in one step. In particular due to the fact that the extensions 26 are relatively flexible and can bend in the direction of the tooth-like or pinnacle-like projection also during removal from the mould, they can be manufactured by means of an injection mould despite the fact that in the final state they represent an undercut.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A hollow fiber membrane separation device with two flow spaces, of which a first space is formed by the capillary tube passages of a hollow-fiber bundle cast at its ends into a sealing compound, and a second space is formed by a housing enclosing the fiber bundle, said first space being sealed off by caps placed on the sealing compounds, said housing, into which the hollow-fiber bundle is drawn, comprising at each of its longitudinal ends, tooth-like or pinnacle-like projections formed by axial notches or indentations, said projections running out freely in an axial direction of said housing, said housing having, between the tooth-like or pinnacle-like projections, extensions extending from the projections, said extensions extending to the adjacent tooth-like or pinnacle-like projection, said projections with said extensions being connected to said sealing compound at each of said housing ends to reduce stress on said hollow fiber bundle.

2. The hollow fiber membrane separation device according to claim 1, wherein the extensions are formed as arch-shaped or sickle-shaped hooks.

3. The hollow fiber membrane separation device according to claim 1, wherein over the height of a tooth-like or pinnacle-like projection and extending therefrom two extensions branch towards each side.

4. The hollow fiber membrane separation device according to claim 1, wherein the extensions extending from the tooth-like or pinnacle-like projections are not connected to the adjacent tooth-like or pinnacle-like projections.

5. The hollow fiber membrane separation device according to claim 1, wherein the extensions extending from the tooth-like or pinnacle-like projections are connected to the adjacent tooth-like or pinnacle-like projections.

6. The hollow fiber membrane separation device according to claim 1, wherein the housing is made in one piece by injection moulding of a flexible plastic material.

7. A housing of a hollow fiber membrane separation device having two flow spaces, of which a first space is formed by the capillary tube passages of a hollow fiber bundle cast at its ends into a sealing compound and sealed off by caps, said housing enclosing the fiber bundle to form a second space, said housing comprising, tooth-like or pinnacle-like projections at each longitudinal end of said housing, said projections being formed by axial notches or indentations at said ends that run out freely and axially with respect to said housing, said tooth-like or pinnacle-like projections of said housing having extensions extending from sides thereof toward an adjacent tooth-like or pinnacle-like projection, said projections with said extensions being connected with said sealing compound at each of said housing ends to reduce stress on said hollow fiber bundle.

8. The housing according to claim 7, wherein the extensions are formed as arch-shaped or sickle-shaped hooks.

9. The housing according to claim 7, wherein each tooth-like or pinnacle-like projection has at least two sides with two extensions branching out from each side.

10. The housing according to claim 7, wherein the extensions extending from the tooth-like or pinnacle-like projections are not connected to the adjacent tooth-like or pinnacle-like projections.

11. The housing according to claim 7, wherein the extensions extending from the tooth-like or pinnacle-like projections are connected to the adjacent tooth-like or pinnacle-like projections.

12. The housing according to claim 7, wherein the housing is made in one piece by injection moulding of a flexible plastic material.

13. A housing of a hollow fiber membrane separation device having a first flow space and a second flow space, said first space being formed by the capillary tube passages of a hollow fiber bundle drawn into said housing and cast at its ends into a sealing compound, said housing enclosing the fiber bundle to form said second space, said housing comprising:
- a longitudinally extending pipe-shaped body having two opposite ends; and
- a plurality of tooth-like or pinnacle-like projections extending from each of said ends, said tooth-like or pinnacle-like projections having branching extensions on sides thereof that extend toward an adjacent tooth-like or pinnacle-like projection, said projections with said extensions being connected with said sealing compound at each of said housing ends to reduce stress on said hollow fiber bundle.

14. The housing according to claim 13, wherein the extensions are formed as arch-shaped or sickle-shaped hooks.

15. The housing according to claim 13, wherein each tooth-like or pinnacle-like projection has at least two sides with two extensions branching out from each side over the height of the projection.

16. The housing according to claim 13, wherein the extensions extending from the tooth-like or pinnacle-like projections are not connected to the adjacent tooth-like or pinnacle-like projections.

17. The housing according to claim 13, wherein the extensions extending from the tooth-like or pinnacle-like projections are connected to the adjacent tooth-like or pinnacle-like projections.

18. The housing according to claim 13, wherein the housing is made in one piece by injection moulding of a flexible plastic material.

\* \* \* \* \*